United States Patent
Hoemske et al.

(10) Patent No.: US 12,203,889 B2
(45) Date of Patent: Jan. 21, 2025

(54) INSPECTION APPARATUS WITH INTEGRATED ELECTRONICS

(71) Applicant: Baker Hughes Holdings LLC, Houston, TX (US)

(72) Inventors: Benjamin Hoemske, Hurth (DE); Johannes Buechler, Siegburg (DE); Tobias Bruch, Cologne (DE)

(73) Assignee: Baker Hughes Holdings LLC, Houston, TX (US)

( * ) Notice: Subject to any disclaimer, the term of this patent is extended or adjusted under 35 U.S.C. 154(b) by 273 days.

(21) Appl. No.: 17/985,234

(22) Filed: Nov. 11, 2022

(65) Prior Publication Data

US 2024/0159712 A1    May 16, 2024

(51) Int. Cl.
*G01N 29/06* (2006.01)
*G01N 29/24* (2006.01)
*G01N 29/265* (2006.01)
*G01N 29/28* (2006.01)

(52) U.S. Cl.
CPC ....... *G01N 29/0645* (2013.01); *G01N 29/265* (2013.01); *G01N 29/28* (2013.01); *G01N 2291/023* (2013.01); *G01N 2291/106* (2013.01)

(58) Field of Classification Search
CPC ........ G01N 29/00; G01N 29/04; G01N 29/06; G01N 29/0645; G01N 29/22; G01N 29/24; G01N 29/26; G01N 29/265; G01N 29/28; G01N 2291/023; G01N 2291/106
See application file for complete search history.

(56) References Cited

U.S. PATENT DOCUMENTS

| 3,257,843 | A | * | 6/1966 | Cowan | ............... G01N 29/2493 73/639 |
|---|---|---|---|---|---|
| 5,963,882 | A | | 10/1999 | Viertl et al. | |
| 6,869,401 | B2 | | 3/2005 | Gilbert et al. | |

(Continued)

FOREIGN PATENT DOCUMENTS

KR        101358343 B1 * 2/2014 ............. G01N 29/06

OTHER PUBLICATIONS

Machine Translation of KR-101358343-B1 (Year: 2014).*

(Continued)

*Primary Examiner* — Nguyen Q. Ha
(74) *Attorney, Agent, or Firm* — Mintz, Levin, Cohn, Ferris, Glovsky and Popeo, P.C.

(57) ABSTRACT

Systems, methods, and apparatuses are provided for examining a object under test. The apparatus can include a housing and a handle. The housing can include a sensing unit including a plurality of ultrasonic transducers, a circuit, a control unit, a display unit, and a communication interface. The circuit can include a memory, and a plurality of transceiver circuits coupled to the plurality of ultrasonic transducers. On receiving a triggering signal, the plurality of ultrasonic transducers emanates an ultrasonic beam to a object under test and can sense a reflected ultrasonic beam to generate a sensed signal. The control unit can process the received sensed signal to provide a processed data. The display unit can display the processed data. The communication interface can transmit the processed data to a monitoring device over a network. The handle has a frame configured to support the housing and allow the housing to rotate.

19 Claims, 7 Drawing Sheets

(56) References Cited

U.S. PATENT DOCUMENTS

| | | |
|---|---|---|
| 9,244,043 B2 | 1/2016 | Buechler et al. |
| 9,658,193 B2 * | 5/2017 | Jenkins ................ G01N 29/262 |
| 9,664,030 B2 | 5/2017 | Pulley |
| 2001/0032513 A1 * | 10/2001 | Havira ................... G01B 17/00 |
| | | 73/639 |
| 2010/0212429 A1 | 8/2010 | Isobe et al. |
| 2012/0291555 A1 * | 11/2012 | Hackenberger .... G01N 29/2493 |
| | | 73/635 |
| 2018/0164258 A1 | 6/2018 | Feydo et al. |
| 2020/0033296 A1 | 1/2020 | Friend |
| 2022/0205890 A1 | 6/2022 | Chen |

OTHER PUBLICATIONS

International Search Report and Written Opinion Received for PCT Patent Application No. PCT/US2023/078646, mailed on Mar. 6, 2024, 10 pages.

\* cited by examiner

INSPECTION APPARATUS WITH INTEGRATED ELECTRONICS

BACKGROUND

A phased array ultrasonic detector can be used for non-destructive testing. The phased array ultrasonic detector includes an array of transducers. Each of the transducers can be configured to independently control the timing and/or the phase of transmitting an ultrasonic wave, and form a synthesized ultrasonic wavefront, thereby controlling an ultrasonic beam. A controlled ultrasonic beam can be deflected and focused on an object under testing. The phased array ultrasonic detector can be moved over or along the object under testing and can be configured to receive data characterizing the structure of the object. The phased array ultrasonic detector can be used to obtain ultrasonic data regarding the structure, such as for thickness, detection of defects and porosity, and/or cracks in the structure.

SUMMARY

In general, devices, system, and methods are provided for examining an object under test using non-destructive testing.

In one aspect, a system is provided. In one embodiment, the system can include a sensing unit and a monitoring device. In one embodiment, the sensing unit can include a plurality of ultrasonic transducers, a circuit, a control unit, and a communication interface. The circuit can be coupled to the plurality of ultrasonic transducers. The circuit can include a memory configured to store a set of instructions and a plurality of transceiver circuits coupled to the plurality of ultrasonic transducers. Each transceiver circuit of the plurality of transceiver circuits can be configured to generate a triggering signal. The triggering signal can be transmitted to at least one of the plurality of ultrasonic transducers to emanate an ultrasonic beam to an object under test. The plurality of ultrasonic transducers can be configured to sense a reflected ultrasonic beam from the object under test and generate a sensed signal. The plurality of transceiver circuits can be further configured to receive the sensed signal from the plurality of ultrasonic transducers. The control unit can be configured to control the generation of the triggering signal and to process the received sensed signal to generate a processed data. The communication interface can be coupled to the control unit and configured to transmit the processed data over a network. The monitoring device can be communicably coupled to the sensing unit. The monitoring device can be configured to receive the processed data from the sensing unit, and determine at least one characteristic of the object under test based on the received processed data.

In another aspect, an apparatus is provided. In one embodiment, the apparatus can include a housing. In one embodiment, the apparatus can include a sensing unit. The sensing unit can include a plurality of ultrasonic transducers. The sensing unit can also include a circuit. The circuit can include a memory configured to store a set of instructions and a plurality of transceiver circuits coupled to the plurality of ultrasonic transducers. Each transceiver circuit of the plurality of transceiver circuits is configured to generate a triggering signal. The triggering signal can be transmitted to at least one of the plurality of ultrasonic transducers to emanate an ultrasonic beam to an object under test. The plurality of ultrasonic transducers can be configured to sense a reflected ultrasonic beam from the object under test and generate a sensed signal. The plurality of transceiver circuits can be further configured to receive the sensed signal from the plurality of ultrasonic transducers. The sensing unit can also include a control unit configured to control the generation of the triggering signal and to process the received sensed signal to provide a processed data. The sensing unit can also include a display unit configured to display the processed data. The sensing unit can also include a communication interface. The communication interface can be coupled to the control unit and configured to transmit the processed data to a monitoring device over a network. The apparatus can also include a handle having a frame configured to support the housing and allow the housing to rotate.

DESCRIPTION OF DRAWINGS

These and other features will be more readily understood from the following detailed description taken in conjunction with the accompanying drawings, in which.

Figure 1:
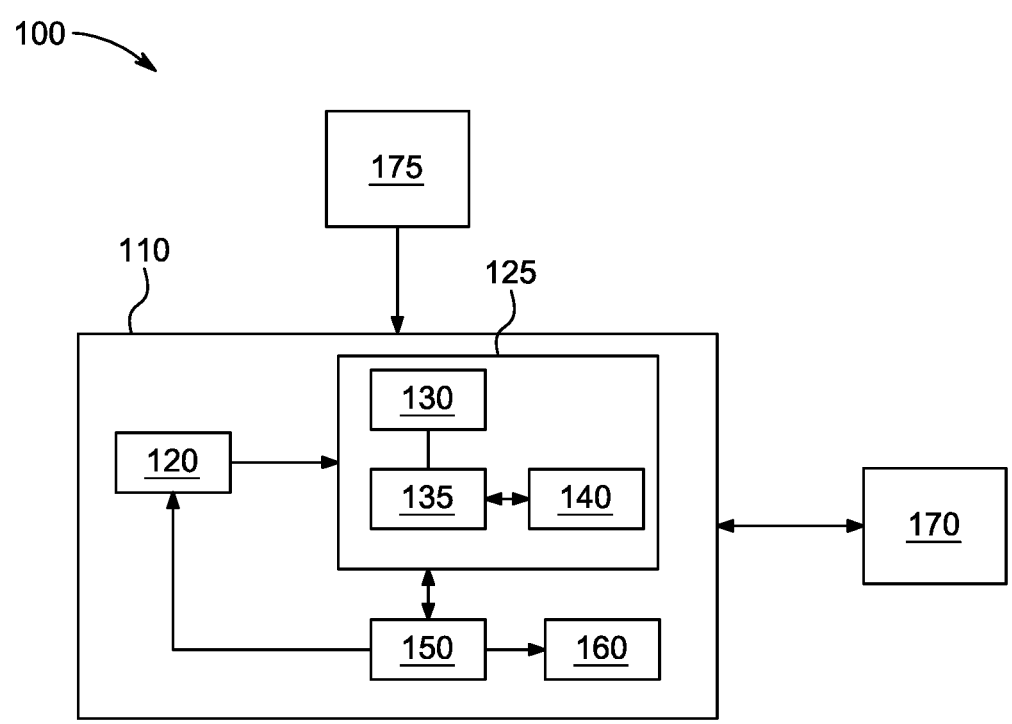
FIG. 1 is a diagram illustrating an exemplary embodiment of a system for examining an object under test.

It is noted that the drawings are not necessarily to scale. The drawings are intended to depict only typical aspects of the subject matter disclosed herein, and therefore should not be considered as limiting the scope of the disclosure.

DETAILED DESCRIPTION

In a conventional phased array ultrasonic inspection system or apparatus a series of transducers can be arranged in a single assembly (known as a probe). Each of the transducers can be pulsed individually to generate a beam into an object being inspected. The transducers can be controlled to generate a focused beam. The focused beam can be used to increase the scanning depth. The transducers can be further configured to receive reflected beam(s) from an object under inspection. The reflected beams can be characterized by a sensed signal that may be further received by a processor to generate a record of the sensed signal i.e. the sensed data corresponding to the reflected beams. The pulse timing for each of the transducers can be controlled based on user input received from a user device. The user device can be configured to receive the sensed data from the probe and analyze the sensed data to determine flaws in the object. The user device can be configured to employ various algorithms to reconstruct a usable non-destructive inspection (NDI) image from the sensed data. The phased array ultrasonic inspection system or apparatus can be employed in various applications, including welding inspection, corrosion inspection, composite inspection, and thickness measurement. The phased array ultrasonic inspection system can also be employed to detect cracks, voids, pits caused by corrosion, changes in material properties, assess the quality of welds and rivets, and inspect joints and interfaces.

Existing systems for inspecting an object non-destructively are expensive to operate and maintain, as they involve complex mechanical circuitry that results in long production downtime. Due to multiple data optimization features, the phased array ultrasonic inspection apparatus must be handled by a trained operator to eliminate any risk associated with testing and handling of the apparatus. Generally, various components or modules of the ultrasonic inspection apparatus are interconnected using several signal cables. Furthermore, the ultrasonic transducer apparatus and the user device are connected through one or more cables (e.g., signal cables) having a length of several meters, thereby providing a bulky and heavy system. When the object is inspected using such ultrasonic inspection apparatus, the operator is required to hold the ultrasonic inspection apparatus along with the signal cable and the user device. Further, the operator can be required to check a display while carrying out an accurate alignment of the ultrasonic transducer and proper scanning of the object under inspection. Using the ultrasonic inspection apparatus that is bulky, it is very difficult for the operator to use the ultrasonic transducer apparatus with accurate position adjustment, and scanning of the object under inspection.

An improved inspection system is provided herein, including systems, apparatuses, and methods for examining an object under test. The inspection system can include a circuit having a stack of printed circuit boards. The improved inspection system can be configured to integrate the electronics into the circuit, resulting in a lightweight assembly capable of displaying to any particular display device. The improved inspection system eliminates the need for several signal cables that can be required for establishing communication, either electrical or data, between the components of the inspection apparatus. Further, the improved inspection system can be configured to be compatible with existing user devices for digital transmission.

The improved inspection system described herein can address the technical problem of providing a lightweight apparatus by integrating the various electrical components or modules into a lightweight and compact assembly. As compared to other inspection apparatuses, the improved inspection apparatus can include a circuit having a stack of printed circuit boards, thereby reducing the weight and dimensions of the inspection apparatus. Furthermore, the improved inspection apparatus requires fewer parts, offering simple installation and requiring no specific connecting cable/interface between the apparatus and the user device. The improved inspection apparatus also has easy connectivity. The improved inspection apparatus can be conveniently transported to different locations or heights with ease.

Embodiments of systems, apparatus, and methods for examining an object under test are discussed herein. However, embodiments of the disclosure can be employed for examining objects using a broad variety of machinery or machinery components without limit.

FIG. 1 is a diagram illustrating an exemplary embodiment of a system 100 examining an object under test. In an aspect, the surface of the object under test can be a curved surface, a flat surface, or a solid metallic surface. As shown in FIG. 1, the system 100 can include a sensing unit 110 and a monitoring device 170. In an aspect, the sensing unit 110 and the monitoring device 170 can be configured to communicate with each other over a network. For example, the network can be a wireless network or a wired network. In some embodiments, the sensing unit 110 and the monitoring device 170 can be integrated together into a single device. In some embodiments, the sensing unit 110 and the monitoring device 170 can be communicatively coupled without a network.

The sensing unit 110 can include a plurality of ultrasonic transducers 120, a circuit 125, a control unit 150, and a communication interface 160. In an embodiment, the sensing unit 110 can be enclosed in a housing. In an aspect, the sensing unit 110 can be configured to transmit ultrasonic beam from the plurality of ultrasonic transducers 120 into the object under test through a couplant. For example, the couplant can be water and/or glycol. In an aspect, the couplant can be sealed within the housing by an acoustically transparent membrane. This arrangement, eliminates a need to continuously supply acoustic coupling fluid between the sensing unit 110 and the surface of the object under test.

The plurality of ultrasonic transducers 120 can be configured to transmit and/or receive ultrasonic waves towards the object under test. Each of the plurality of ultrasonic transducers 120 can be configured to transmit and/or receive ultrasonic waves in a predefined frequency range. In an aspect, the frequency range can be varied with a bias voltage applied to each of the plurality of ultrasonic transducers 120. In an aspect, the plurality of ultrasonic transducers 120 can be placed in a matrix form or an array form, which emits ultrasonic beam. In an aspect, to focus the ultrasonic beam, time delays are applied to each of the plurality of ultrasonic transducers 120 to create constructive interference of the wavefronts, allowing the energy to be focused at any depth in the object under test.

The circuit 125 can be coupled to the plurality of ultrasonic transducers 120. The circuit 125 can include a memory 135, and a plurality of transceiver circuits 140. The memory 135 can be configured to store a set of instructions. The memory 135 can be configured to store received data, and a stored set (range) of predefined values corresponding to surface and object characteristics. In an aspect, the memory 135 can be configured to store a set of tilting angles corresponding to received data. In some embodiments, the memory 135 can be configured to store a set of rules for processing the received data. In one embodiment, the memory 135 may include any computer-readable storage medium known in the art including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The plurality of transceiver circuits 140 can be configured to transmit and receive data from the plurality of ultrasonic transducers 120. The plurality of transceiver circuits 140 can be communicably coupled to the control unit 150 and can receive control signals from the control unit 150. Each of the plurality of transceiver circuits 140 can be coupled to each of the plurality of ultrasonic transducers 120, respectively. Each transceiver circuit 140 can be configured to generate a triggering signal based on the received control signals. The generated triggering signal can be transmitted or provided to at least one of the plurality of ultrasonic transducers 120. On receiving the triggering signal, each of the plurality of ultrasonic transducers 120 can be configured to emit the ultrasonic beam to the object under test. The plurality of ultrasonic transducers 120 can be configured to sense an ultrasonic beam reflected from the object under test and to generate a sensed signal based on the reflected ultrasonic beam. The plurality of transceiver circuits 140 can be configured to receive the sensed signal from the plurality of ultrasonic transducers 120.

In an operative aspect, the control unit 150 can be configured to control the generation of the triggering signal based on an input received from a user or the monitoring device. Further, the control unit 150 can be configured to receive the sensed signal from the plurality of ultrasonic transducers 120 and process the received sensed signal to generate a processed data. In one aspect, the input can be fed to the control unit 150 manually by the user or automatically by the monitoring device based on the analyzed data in a real-time scenario. For example, if the tilting angle of the plurality of ultrasonic transducers 120 is to be changed, then the control unit 150 generates the control signal causing the change in the tilting angle of the transducers. The plurality of transceiver circuits 140, in communication with the memory 135, generates the triggering signal and actuates the plurality of ultrasonic transducers 120 accordingly. In an aspect, the sensing unit 110 can include an actuation unit for performing various actions, such as rotation of the plurality of ultrasonic transducers 120 for covering the object under test. In an aspect, the control unit 150 can be configured to adjust position and direction of each of the plurality of ultrasonic transducers 120, resulting in different angles and focal distances of the ultrasonic beam.

As shown in FIG. 1, the communication interface 160 can be coupled to the control unit 150 and receive the processed data from the control unit 150. The communication interface 160 can be configured to transmit the processed data over the network. In an aspect, the communication interface can be a plug-and-play interface, such as a USB interface, or the like. In some embodiments, the communication interface 160 can include at least one antenna for transmitting and receiving data. In an embodiment, the sensing unit 110 can be capable of being paired with a Bluetooth-wireless-connectivity TDMA-based, GSM-based, CDMA-based, or AMPS-based standard transceiver. In an embodiment, the sensing unit 110 can be capable of being paired with a standard wireless interface, e.g WLAN.

The monitoring device 170 can be communicably coupled to the control unit 150 over the network. The monitoring device 170 can be configured to receive the processed data from the sensing unit 110, and analyze the processed data to determine at least one characteristic of the object under test. Based on at least one characteristic of the object under test, the monitoring device 170 can be configured to examine the object under test. In an aspect, at least one characteristic of the object can be selected from a group consisting of a transverse crack, a longitudinal crack, an irregularity degree, a structural defect, a deformation, a fracture, a surface breakage, holes, porosity of a material, non-metallic inclusions, and corrosion. The monitoring device 170 can be configured to display a result on a display unit based on at least one determined characteristic of an object under test. In an aspect, the monitoring device 170 can be configured to generate A, E, S, B, C, and D scans of the object under test and display the same on the display unit. In an aspect, the monitoring device 170 can be configured to employ process image acquisition gating, filtering, and noise cancellation for analyzing at least one characteristic of the object under test.

As further shown in FIG. 1, the system 100 can include a power supply 175, such as a battery or an energy providing element to power the system 100. In some embodiments, the power supply 175 can be a rechargeable battery. In some embodiments, the system 100 can include a wired or wireless charging circuit as the power supply 175.

Figure 2A:
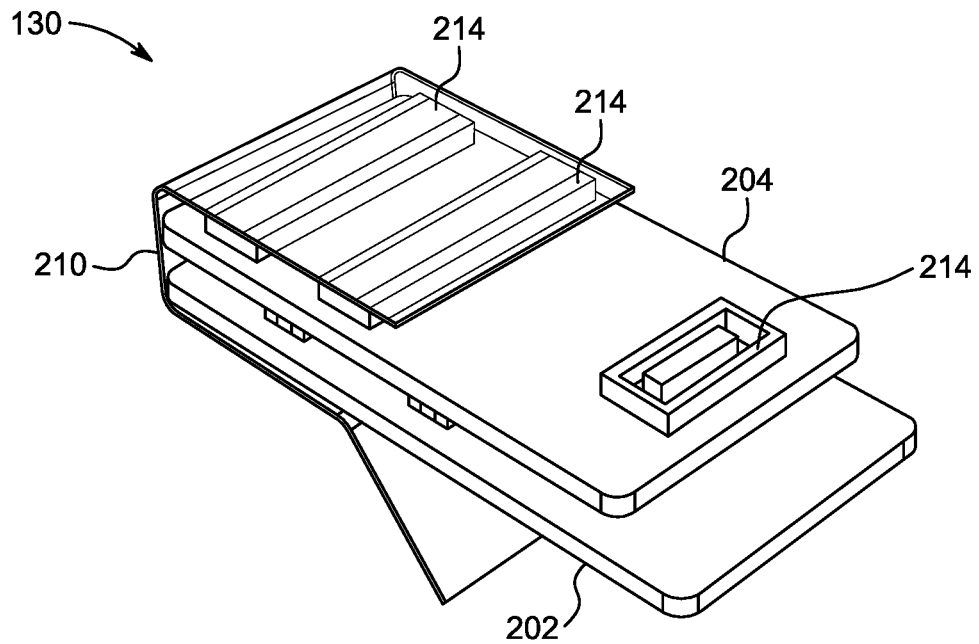
FIGS. 2A-2C are diagrams illustrating an exemplary embodiment of a circuit including a stack of printed circuit boards.
Figure 2B:
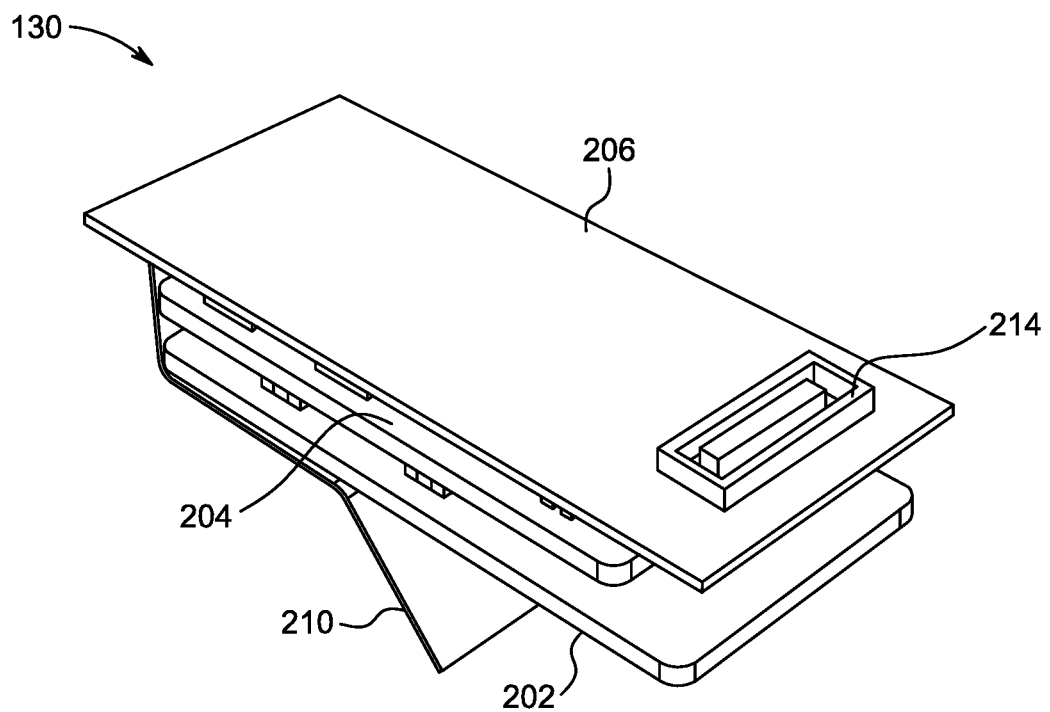
Figure 2C:
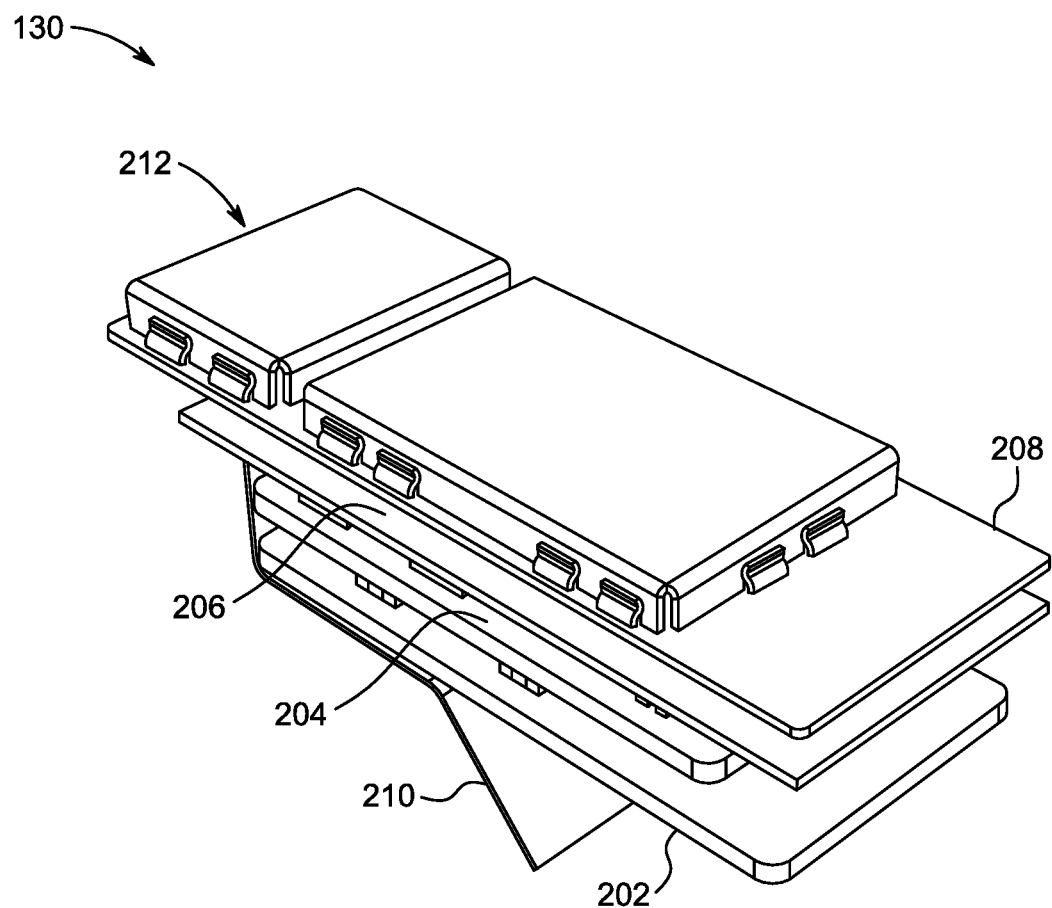

FIGS. 2A-2C are diagrams illustrating an exemplary embodiment of the circuit 125 including a stack 130 of printed circuit boards (PCBs). The stack 130, as shown in FIG. 2C, can include four printed circuit boards (202, 204, 206, and 208). The number of PCBs can be varied depending on the requirements or enhancements to be made in the circuit 125. The stack 130 of the plurality of PCBs can include a first printed circuit board 202, a second printed circuit board 204, a third printed circuit board 206, and a fourth printed circuit board 208. Each PCB can include one or more connectors 214.

As shown in FIG. 2A, the second printed circuit board 204 can be mounted over the first printed circuit board 202. The first printed circuit board 202 and the second printed circuit board 204 can be configured to as a PCB stack, as shown in FIG. 2A. The PCB stack can include a cable 210. In an aspect, the cable 210 can be attached to the control unit 150 and the memory 135. In an embodiment, the cable 210 can be configured to transfer data between the stack with the control unit 150. In an aspect, the cable 210 can be configured to house electrical cables. In an example, the cable 210 can be a flexible cable. In an aspect, the circuit 125 can include at least one connector configured to facilitate a communication path between the plurality of ultrasonic transducers 120 and the plurality of transceiver circuits 140.

As shown in FIG. 2B, the third printed circuit board 206 can be mounted over the second printed circuit board 204 or the PCB stack. In an aspect, the third printed circuit board 206 can include an encoder and a connector 214. In some examples, the third printed circuit board 206 can include an analog-to-digital (A/D) converter, a slot for extendable memory, and like. In an embodiment, the third printed circuit board 206 can include a network interface. In an example, the network interface can include a plurality of separate communication channels, and a plurality of virtual network interface cards. In another aspect, the third printed circuit board 206 can include a connector 214 or connector board on a top layer of the third printed circuit board 206. In an embodiment, a plurality of contact elements can be formed on a surface of an interposer configured to be coupled to provide a data connection to the communication interface through respective ones of a plurality of contact members of the third printed circuit board 206. As shown in FIG. 2C, the fourth printed circuit board 208 can be mounted over the third printed circuit board. The fourth printed circuit board can include a top cover 212. In an aspect, the stack 130 can be fitted into a fluid-tight casing.

Figure 3:
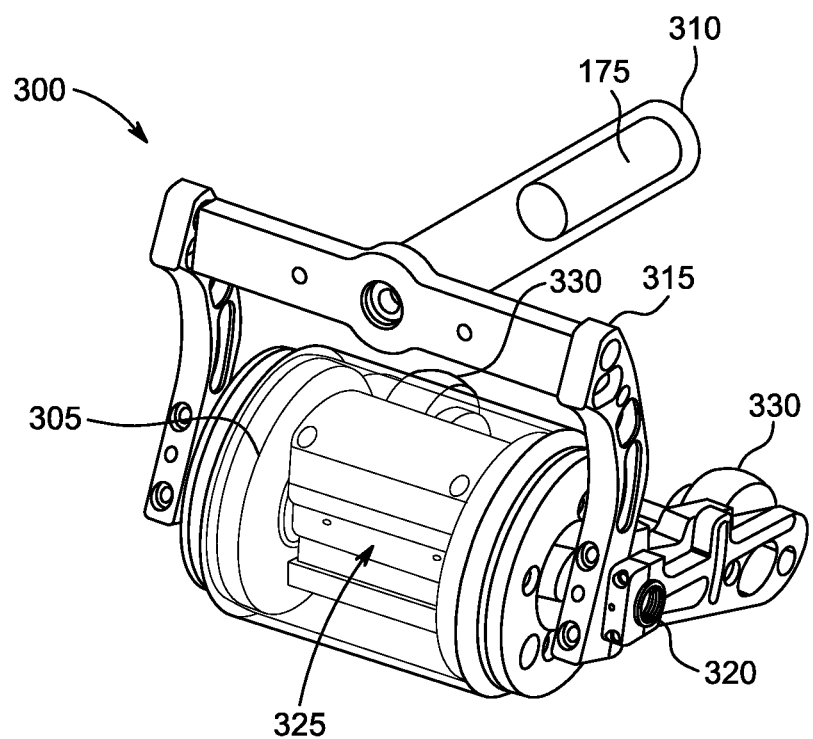
FIG. 3 is a diagram illustrating an exemplary embodiment of an apparatus for examining an object under test.

FIG. 3 is a diagram illustrating an exemplary embodiment of an apparatus 300 for examining an object under test. The apparatus 300 can include a housing 305, a handle 310, and an interface 320.

The housing 305 can include a sensing unit 325. In an example, the housing 305 is a cylindrical housing that can include a first end, a second end, and a rolling surface between the first end and the second end, defining an enclosure to enclose the sensing unit. In an aspect, one of the first end and the second end of the cylindrical housing 305 can be coupled to the interface 320 to facilitate a communication path between the apparatus 300 and the monitoring device. The construction of sensing unit 325 may be substantially similar to that of the sensing unit 110 as shown in FIG. 1, and thus the construction is not repeated here in detail for the sake of brevity.

The sensing unit can include a plurality of ultrasonic transducers, a circuit, a control unit, a display unit, and a communication interface. The plurality of ultrasonic transducers can be configured to transmit and/or receive ultrasonic waves towards the object under test. The circuit can include a memory, and a plurality of transceiver circuits. In an aspect, the circuit can include a stack of printed circuit boards including a first printed circuit board, a second printed circuit board, a third printed circuit board, and a fourth printed circuit board. The second printed circuit board can be mounted over the first printed circuit board. In an example, the second printed circuit board can include a connector. The third printed circuit board can be mounted over the second printed circuit board. In an example, the second printed circuit board can include an encoder and a connector. The fourth printed circuit board is mounted over the third printed circuit board. In an example, the fourth printed circuit board has top cover. In an example, the dimension of the stack of printed circuit boards can be 15 mm-30 mm.

The memory can be configured to store a set of instructions. The memory can be configured to store received data, and a stored set (e.g., a range) of predefined values corresponding to the determined characteristic of the surface or the object under test. In an aspect, the memory can be configured to store a set of angles corresponding to received data. In some embodiments, the memory can be configured to store a set of rules for processing the received data. In one embodiment, the memory may include any computer-readable storage medium known in the art including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The plurality of transceiver circuits can be configured to transmit and receive data from the plurality of ultrasonic transducers. Each of the plurality of transceiver circuits can be coupled to each of the plurality of ultrasonic transducers, respectively. The plurality of transceiver circuits can be communicably coupled to the control unit and receives a control signal from the control unit. Each transceiver circuit can be configured to generate a triggering signal based on the received control signals. The generated triggering signal is transmitted (fed) to at least one of the plurality of ultrasonic transducers. On receiving the triggering signal, each of the plurality of ultrasonic transducers can be configured to emanate the ultrasonic beam towards the object under test. Further, the plurality of ultrasonic transducers can be configured to sense reflected ultrasonic beam from the object under test and to generate a sensed signal based on the reflected ultrasonic beam. The plurality of transceiver circuits can be further configured to receive the sensed signal from the plurality of ultrasonic transducers.

In an operative aspect, the control unit can be configured to control the generation of the triggering signal based on an input received from a user or the monitoring device. Further, the control unit can be configured to receive the sensed signal from the plurality of ultrasonic transducers and processes the received sensed signal to generate processed data. In an aspect, the control unit can be configured to adjust position and direction of each of the plurality of ultrasonic transducers resulting in different angles and focal distances of the ultrasonic beam.

The communication interface can be coupled to the control unit and receives the processed data from the control unit. The communication interface can be configured to transmit the processed data to a monitoring device over the network. In an aspect, the communication interface is a plug-and-play interface, such as a USB interface, or the like.

The display unit can be communicably coupled to the control unit and receives the processed data. The display unit can be configured to display processed data. In an aspect, the display unit can be configured to display A, E, S, B, C, and D scans of the object under test.

In some embodiments, the apparatus 300 may include at least one antenna for transmitting and receiving data. In an embodiment, the apparatus 300 may be capable of being paired with any of a Bluetooth-wireless-connectivity TDMA-based, GSM-based, CDMA-based, and AMPS-based standard transceiver. In an aspect, the apparatus 300 can implement a standard digital interface using digital transmission over a cable, e.g., USB, PCIe, Ethernet, or over a wireless interface, e.g., WLAN, for data transmission to the monitoring device.

In some embodiments, the apparatus 300 may at least include one power supply 175, such as a battery. In one embodiment, the power supply 175 may be integrated in the handle 310. In another embodiment, the power supply 175 may be integrated in the housing 405. In another embodiment, the power supply 175 may be integrated in the sensing unit 325.

The handle 310 can include a frame 315 that is configured to support the housing 305 and to allow the housing 305 to rotate. In an aspect, the frame 315 can be rigid, lightweight, adjustable, and highly configurable. The frame 315 can be designed to cooperate or engage with the housing 305 and can be configured to employ guiding members to provide consistent, reliable, and alignment to the housing with respect to the surface of the object under test. In an aspect, the apparatus 300 can include a plurality of guiding wheels attached to the frame 315, where the plurality of guiding wheels facilitates the rolling of the cylindrical housing 305 in a predetermined direction over the surface of the object under test. For example, if the surface under test is a cylindrical surface, then the guiding wheels rest on the surface and guide the apparatus 300 in the desired direction without slipping or disorienting the apparatus 300 in any other direction. As further shown in FIG. 3, the apparatus 300 can include guide wheels 330 that can be coupled to the frame 315. The guide wheels 330 can enable the apparatus to translate over the surface of the object under test. In some embodiments, the guide wheels 330 can be configured to provide translation in a single direction (e.g., forward or backward) or two directions (e.g., forward and backward).

Figure 4:
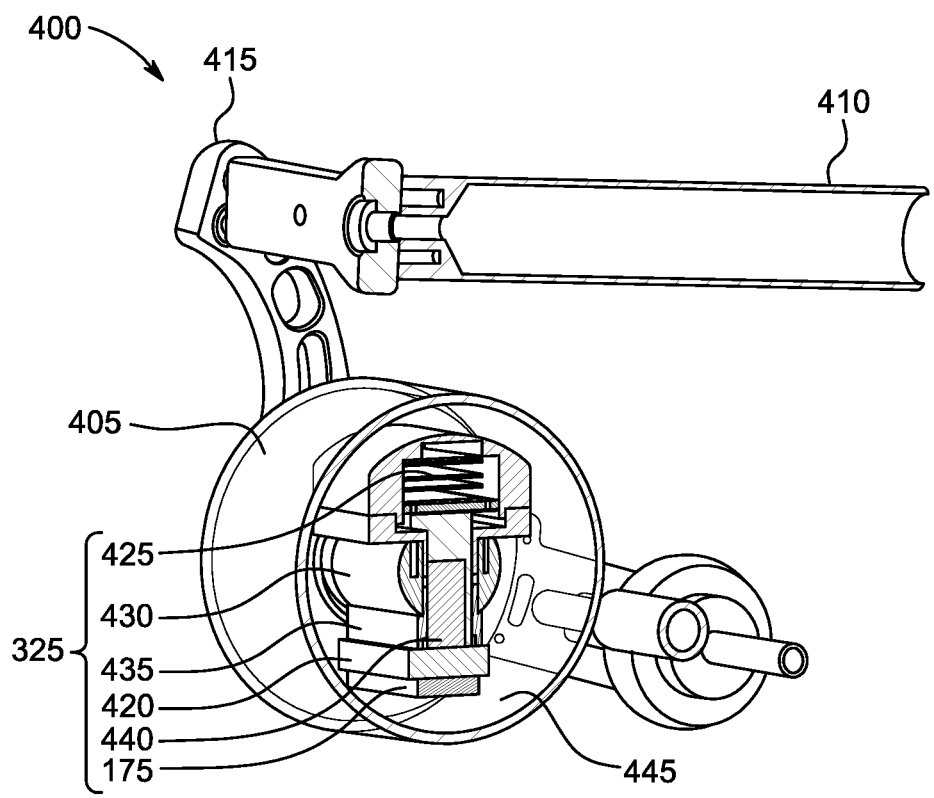
FIG. 4 is a diagram of a side view of the apparatus of FIG. 3.

FIG. 4 is a diagram of a side view of an embodiment of an apparatus 400, which corresponds to the apparatus 300 of FIG. 3, excepted as indicated below. As shown in FIG. 4, the apparatus 400 can include a housing 405, a handle 410, a frame 415, a circuit 425, an axle 430, a spacer 435, a backing element 440, and a transducer 420. The apparatus 400 can include a power supply 175 provided within the housing 405 and integrated with the sensing unit 325. The handle 410 can include a frame 415 that is configured to support the housing 405 In an aspect, the housing 405 can include a couplant 445. In some embodiments, the apparatus 300 can include an analog board, and a digital board. The circuit 425 can include a stack of printed circuit boards. As shown in FIG. 4, the circuit 425 can be fixed over the axle 430 of the housing 405.

As shown in FIG. 4, the frame 415 is a U-shape frame that can be configured to hold ends of the housing 405. The spacer 435 can be configured to provide spacing or/and compression to the circuit 425 thereby guarding from any damage arise due to motion of the apparatus 300. The backing element 440 can be configured to provide insulation between the circuit 425 and the transducer 420. The transducer 420 can be configured to emanate an ultrasonic beam to a object under test. Further, the transducer 420 can be configured to sense a reflected ultrasonic beam from the object under test and generate a sensed signal.

Figure 5A:
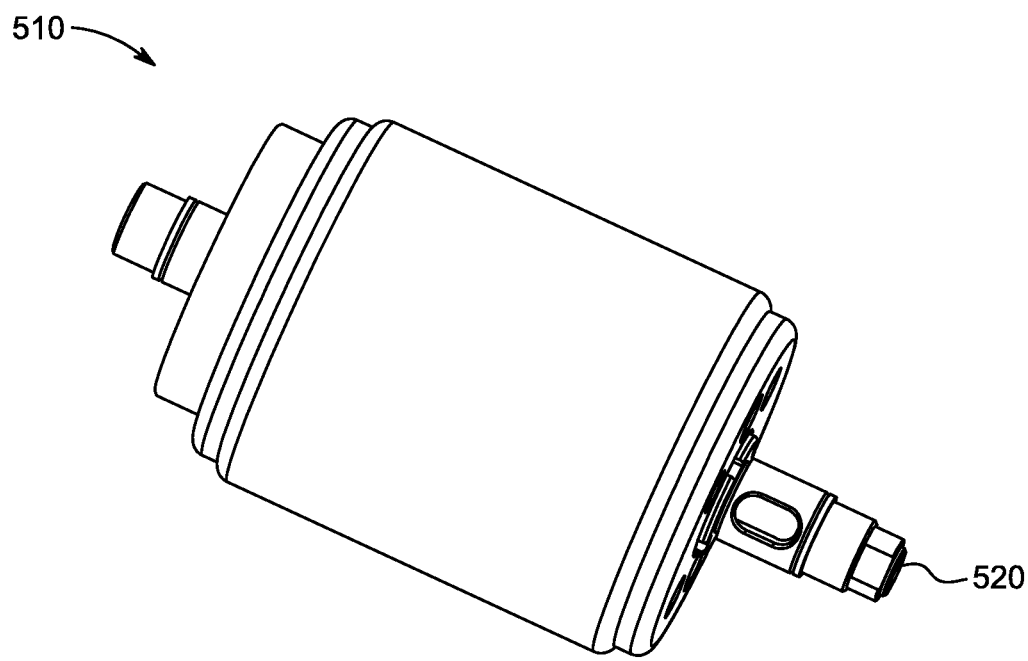
FIGS. 5A-5B are diagrams of a sensing unit included in the system of FIGS. 1-2.
Figure 5B:
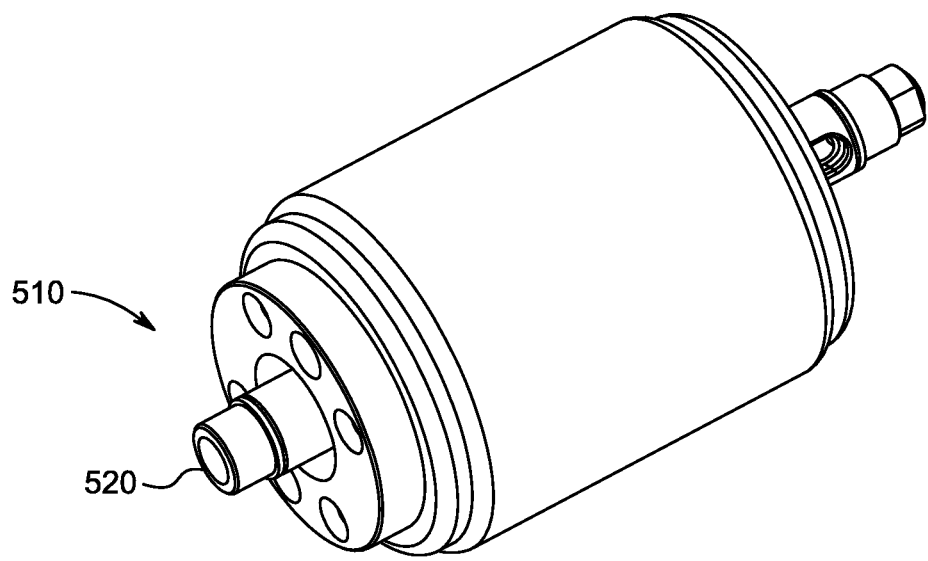

FIG. 5A-FIG. 5B are diagrams of the sensing unit 110 included in the system 100 of FIGS. 1-2. As shown in FIG. 5A-FIG. 5B, the communication interface 520 can be coupled to the sensing unit 510. The communication interface 520 can be a plug-and-play interface selected from the group consisting of a USB interface, an IEEE 1394 interface, a thunderbolt interface, and a dock connector interface.

Figure 6:
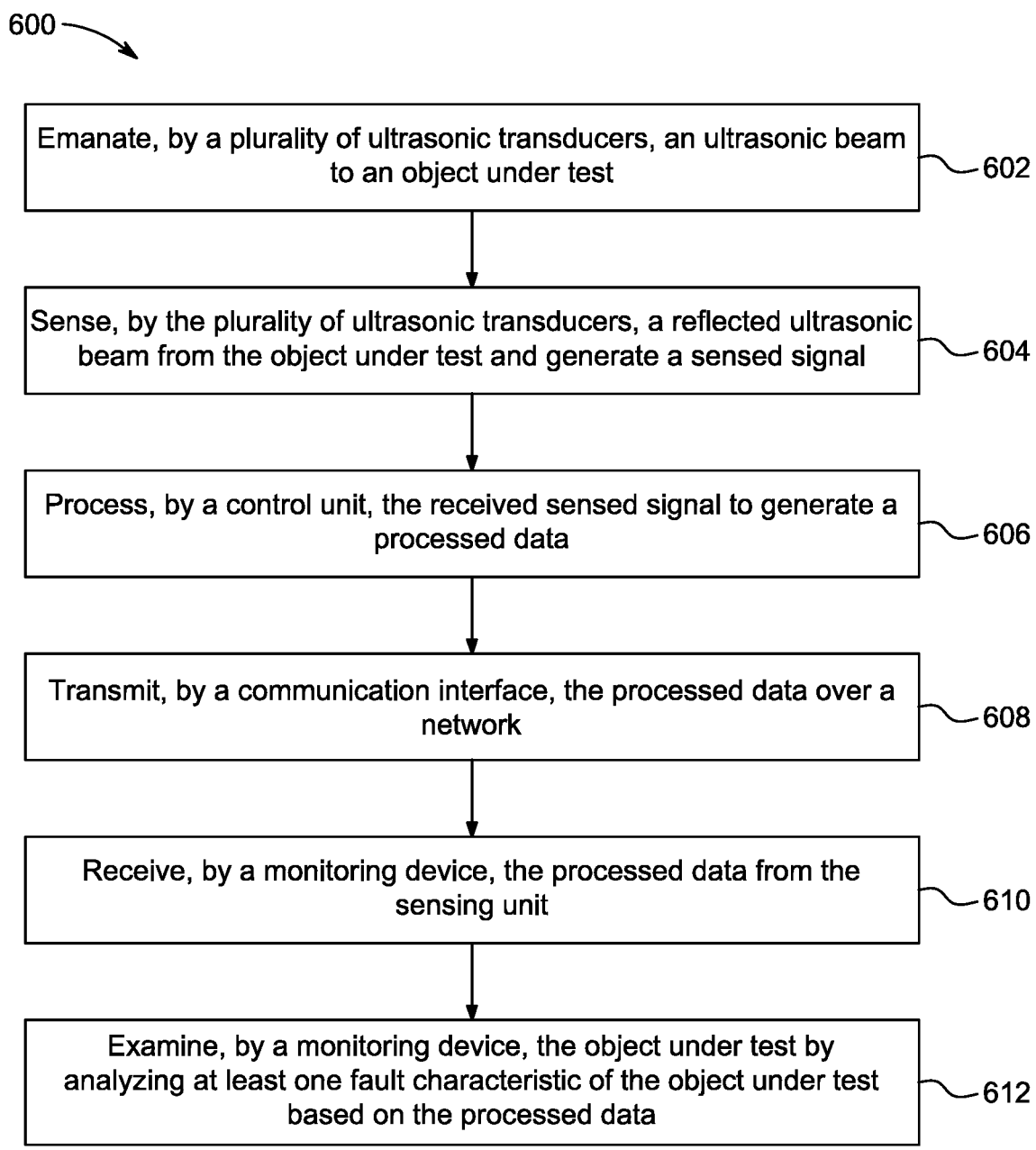
FIG. 6 is a flowchart illustrating one exemplary embodiment of a method for examining an object under test using the system of FIGS. 1-2 and the apparatus of FIG. 3.

FIG. 6 is a flowchart illustrating one exemplary embodiment of a method 600 for examining a object under test using the system 100 of FIGS. 1-2 and the apparatus 300 of FIG. 3.

In operation 610, the plurality of ultrasonic transducers 120 can be configured to emanate or transmit an ultrasonic beam to an object under test. In an embodiment, each of the transceiver circuits can be configured to generate a triggering signal. The plurality of ultrasonic transducers 120 can be configured to receive the triggering signal from the transceiver circuits and emanates the ultrasonic beam to the object under test.

In operation 620, the plurality of ultrasonic transducers 120 can be configured to sense a reflected ultrasonic beam from the object under test and generate a sensed signal. In an aspect, the plurality of transceiver circuits 140 is configured to receive the sensed signal from the plurality of ultrasonic transducers 120.

In operation 630, the control unit 150 can be configured to receive sensed signal from the plurality of ultrasonic transducers 120. The control unit 150 can be configured to process the received sensed signal and generates a processed data.

In operation 640, the communication interface 160 can be configured to transmit the processed data over a network.

In operation 650, the monitoring device 170 can be configured to receive the processed data from the sensing unit.

In operation 660, the monitoring device 170 can be configured to examine the object under test by analyzing at least one characteristic of the object under test based on the processed data.

Figure 7:
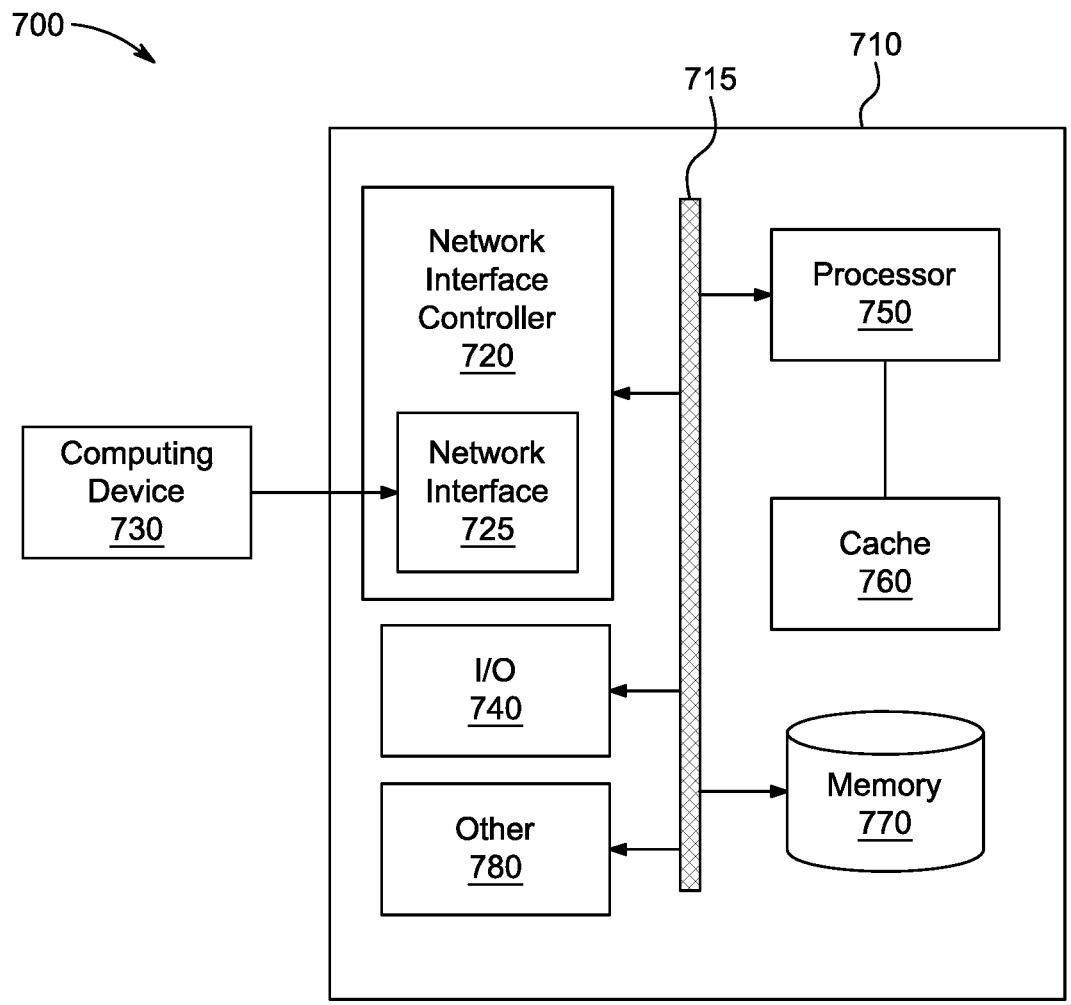
FIG. 7 is a block diagram of an exemplary computing system in accordance with an illustrative implementation of the system of FIG. 1.

FIG. 7 is a block diagram 700 of a computing system 710 suitable for use in implementing the computerized components described herein. In broad overview, the computing system 710 includes at least one processor 750 for performing actions in accordance with instructions, and one or more memory devices 760 and/or 770 for storing instructions and data. The illustrated example computing system 710 includes one or more processors 750 in communication, via a bus 715, with memory 770 and with at least one network interface controller 720 with a network interface 725 for connecting to external devices 730, e.g., a computing device (such as sensing unit 110, or a monitoring device 170). The one or more processors 750 are also in communication, via the bus 715, with each other and with any I/O devices at one or more I/O interfaces 740, and any other devices 780. The processor 750 illustrated incorporates, or is directly connected to, cache memory 760. Generally, a processor will execute instructions received from memory. In some embodiments, the computing system 710 can be configured within a cloud computing environment, a virtual or containerized computing environment, and/or a web-based microservices environment.

In more detail, the processor 750 can be any logic circuitry that processes instructions, e.g., instructions fetched from the memory 770 or cache 760. In many embodiments, the processor 750 is an embedded processor, a microprocessor unit or special purpose processor. The computing system 710 can be based on any processor, e.g., suitable digital signal processor (DSP), or set of processors, capable of operating as described herein. In some embodiments, the processor 750 can be a single core or multi-core processor. In some embodiments, the processor 750 can be composed of multiple processors.

The memory 770 can be any device suitable for storing computer readable data. The memory 770 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 710 can have any number of memory devices 770.

The cache memory 760 is generally a form of high-speed computer memory placed in close proximity to the processor 750 for fast read/write times. In some implementations, the cache memory 760 is part of, or on the same chip as, the processor 750.

The network interface controller 720 manages data exchanges via the network interface 725. The network interface controller 720 handles the physical and data link layers of the Open Systems Interconnect (OSI) model for network communication. In some implementations, some of the network interface controller's tasks are handled by the processor 750. In some implementations, the network interface controller 720 is part of the processor 750. In some implementations, a computing device 710 has multiple network interface controllers 720. In some implementations, the network interface 725 is a connection point for a physical network link, e.g., an RJ 45 connector. In some implementations, the network interface controller 720 supports wireless network connections and an interface port 725 is a wireless receiver/transmitter. Generally, a computing device 710 exchanges data with other network devices 730, such as computing device 730, via physical or wireless links to a network interface 725. In some implementations, the network interface controller 720 implements a network protocol such as Ethernet, I2C, and/or Bluetooth low-energy protocols.

The other computing devices 730 are connected to the computing device 710 via a network interface port 725. The other computing device 730 can be a peer computing device, a network device, or any other computing device with network functionality. For example, a computing device 730 can be a sensing unit 110, or a monitoring device 170, which may be configured within the system 100 illustrated in FIG. 1. In some embodiments, the computing device 730 can be a network device such as a hub, a bridge, a switch, or a router, connecting the computing device 710 to a data network such as the Internet.

In some uses, the I/O interface 740 supports an input device and/or an output device (not shown). In some uses, the input device and the output device are integrated into the same hardware, e.g., as in a touch screen. In some uses, such as in a server context, there is no I/O interface 740 or the I/O interface 740 is not used. In some uses, additional other components 780 are in communication with the computer system 710, e.g., external devices connected via a universal serial bus (USB).

The other devices 780 can include an I/O interface 740, external serial device ports, and any additional co-processors. For example, a computing system 710 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 710, e.g., a touch screen on a tablet device. In some implementations, a computing device 710 includes an additional device 780 such as a co-processor, e.g., a math co-processor that can assist the processor 750 with high precision or complex calculations.

Exemplary technical effects of the systems, devices, and methods described herein include, by way of non-limiting example, non-destructive testing of an object for defects within the object or at a surface of the object using rotary sensing apparatus with integrated electronics that is configured to translate on the surface of the object. In one aspect, rotary sensing apparatus can reduce the operational footprint of non-destructive testing and inspection systems allowing for inspection of a wider variety of objects and/or object surfaces than existing rotary sensing apparatuses. As a result, fewer computing devices and communication couplings between components of an inspection system can be provided, which can reduce the cost and complexity of the inspection systems. Also, the rotary sensing apparatus described herein can be transported to and manipulated at an object under test more easily than existing rotary sensing apparatuses due to the compact size and integration of electronics within the apparatus.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system comprising:
   a sensing unit comprising:
      a plurality of ultrasonic transducers;
      a circuit coupled to the plurality of ultrasonic transducers, the circuit comprising:
         a memory configured to store a set of instructions;
         a plurality of transceiver circuits coupled to the plurality of ultrasonic transducers, wherein:
            each transceiver circuit of the plurality of the transceiver circuits is configured to generate a triggering signal, the triggering signal is transmitted to at least one of the plurality of ultrasonic transducers to emanate an ultrasonic beam to an object under test,
            the plurality of ultrasonic transducers are configured to sense a reflected ultrasonic beam from the object under test and generate a sensed signal, and
            the plurality of transceiver circuits is further configured to receive the sensed signal from the plurality of ultrasonic transducers;
      a control unit within the sensing unit configured to control the generation of the triggering signal and to process the received sensed signal to generate processed data;
      a communication interface coupled to the control unit and configured to transmit the processed data over a network; and
   a monitoring device communicably coupled to the sensing unit, the monitoring device configured to:
      receive the processed data from the sensing unit; and
      determine at least one characteristic of the object under test based on the received processed data.

2. The system of claim 1, wherein the circuit further includes a stack of printed circuit boards having:
   a first printed circuit board;
   a second printed circuit board mounted over the first printed circuit board;
   a third printed circuit board mounted over the second printed circuit board; and
   a fourth printed circuit board mounted over the third printed circuit board.

3. The system of claim 1, wherein the sensing unit is configured to transmit ultrasonic beam from the plurality of ultrasonic transducers into the object under test through a couplant.

4. The system of claim 1, wherein the circuit includes at least one connector configured to facilitate a communication path between the plurality of ultrasonic transducers and the plurality of transceiver circuits.

5. The system of claim 1, wherein at least one characteristic is selected from a group consisting of a transverse crack, a longitudinal crack, an irregularity degree, a structural defect, a deformation, a fracture, a surface breakage, holes, a porosity of a material, non-metallic inclusions, and corrosion.

6. The system of claim 1, wherein the monitoring device is configured to display a result based on at least one analyzed characteristic of the object under test.

7. The system of claim 1, wherein the monitoring device is configured to generate A, E, S, B, C, and D scans of the object under test.

8. The system of claim 1, wherein the monitoring device is configured to employ process image acquisition gating, filtering, and noise cancellation for analyzing at least one characteristic of the object under test.

9. The system of claim 1, wherein the communication interface is a plug-and-play interface selected from the group consisting of a USB interface, a 1394 interface, a thunderbolt interface, and a dock connector interface.

10. The system of claim 1, wherein the control unit is configured to adjust position and direction of each of the plurality of ultrasonic transducers resulting in different angle and focal distance of the ultrasonic beam.

11. An apparatus comprising:
a housing comprising:
  a sensing unit comprising:
    a plurality of ultrasonic transducers;
    a circuit comprising:
      a memory configured to store a set of instructions;
      a plurality of transceiver circuits coupled to the plurality of ultrasonic transducers, wherein:
        each transceiver circuit of the plurality of the transceiver circuits is configured to generate a triggering signal,
        the triggering signal is transmitted to at least one of the plurality of ultrasonic transducers to emanate an ultrasonic beam to an object under test,
        the plurality of ultrasonic transducers is configured to sense a reflected ultrasonic beam from the object under test and generate a sensed signal, and
        the plurality of transceiver circuits is further configured to receive the sensed signal from the plurality of ultrasonic transducers;
      a control unit within the sensing unit configured to control the generation of the triggering signal and to process the received sensed signal to provide a processed data; and
      a communication interface coupled to the control unit and configured to transmit the processed data to a monitoring device over a network;
  a handle having a frame configured to support the housing and to allow the housing to rotate;
  a display unit configured to display the processed data.

12. The apparatus of claim 11, wherein the housing is a cylindrical housing, wherein the cylindrical housing comprises a first end, a second end, and a rolling surface between the first end and the second end, defining an enclosure to enclose the sensing unit.

13. The apparatus of claim 12, wherein one of the first end and the second end of the cylindrical housing is coupled to the communication interface to facilitate a communication path between the apparatus and the monitoring device.

14. The apparatus of claim 11, wherein the circuit includes a stack of printed circuit boards having:
  a first printed circuit board;
  a second printed circuit board mounted over the first printed circuit board;
  a third printed circuit board mounted over the second printed circuit board; and
  a fourth printed circuit board mounted over the third printed circuit board.

15. The apparatus of claim 14, wherein the stack of printed circuit boards is fixed over an axle of the housing.

16. The apparatus of claim 11, wherein the communication interface is a plug-and-play interface selected from the group consisting of a USB interface, a 1394 interface, a thunderbolt interface, and a dock connector interface.

17. The apparatus of claim 11, further comprising a power supply, the power supply including a battery.

18. The apparatus of claim 11, further comprising, a plurality of guiding wheels attached to the frame, wherein the plurality of guiding wheels facilitates the rolling of the cylindrical housing in a predetermined direction over the surface of the object under test.

19. The apparatus of claim 11, wherein the frame is a U-shape frame configured to hold opposing ends of the housing.

* * * * *